United States Patent
Nishikawa et al.

(10) Patent No.: US 9,944,048 B2
(45) Date of Patent: Apr. 17, 2018

(54) LASER-BONDED COMPONENT AND PRODUCTION METHOD FOR SAME

(75) Inventors: Yukio Nishikawa, Osaka (JP); Tomomi Tanaka, Osaka (JP); Toshiki Itoi, Nara (JP); Yoshiaki Kobayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/823,388

(22) PCT Filed: Feb. 14, 2012

(86) PCT No.: PCT/JP2012/000962
§ 371 (c)(1),
(2), (4) Date: Mar. 14, 2013

(87) PCT Pub. No.: WO2012/124255
PCT Pub. Date: Sep. 20, 2012

(65) Prior Publication Data
US 2013/0171467 A1 Jul. 4, 2013

(30) Foreign Application Priority Data
Mar. 14, 2011 (JP) ................ 2011-055113

(51) Int. Cl.
*B32B 15/01* (2006.01)
*B23K 26/32* (2014.01)
(Continued)

(52) U.S. Cl.
CPC .......... *B32B 7/045* (2013.01); *B23K 26/211* (2015.10); *B23K 26/244* (2015.10); *B23K 26/32* (2013.01);
(Continued)

(58) Field of Classification Search
USPC ............... 428/671, 674, 675; 219/121.63
See application file for complete search history.

(56) References Cited

U.S. PATENT DOCUMENTS 4,023,005 A * 5/1977 Bolin .................. 219/121.64
4,697,061 A 9/1987 Spater et al.
(Continued)

FOREIGN PATENT DOCUMENTS

| | | |
|---|---|---|
| CN | 1507380 A | 6/2004 |
| DE | 10 2009 013 110 A1 | 9/2009 |

(Continued)

OTHER PUBLICATIONS

English Translation of JP 2010-069489, JPO.*
(Continued)

*Primary Examiner* — Humera N Sheikh
*Assistant Examiner* — Xiaobei Wang
(74) *Attorney, Agent, or Firm* — Pearne & Gordon LLP

(57) ABSTRACT

Provided are a laser-bonded component and a production method for same that ensure sufficient bonding strength using little laser energy and which cause little increase in surrounding temperature. A nickel layer, being a surface layer, is formed having sufficient thickness on the upper surface of a copper plate that is uppermost amongst at least two superposed copper plates, a laser is irradiated from above the nickel layer, a re-solidification section formed by fusing and alloying the copper in the copper plates and the nickel in the nickel layer is formed through to inside the bottommost copper plate, and the copper plates are bonded together. The re-solidification section having high breaking strength is formed by the alloying of the nickel and the copper. As a result, the copper plates can be bonded with a small welding surface area and little laser energy.

5 Claims, 7 Drawing Sheets

(51) Int. Cl.
*B32B 7/04* (2006.01)
*B23K 26/211* (2014.01)
*B23K 26/244* (2014.01)
B23K 103/12 (2006.01)
B23K 101/34 (2006.01)
B23K 103/18 (2006.01)

(52) U.S. Cl.
CPC ...... *B23K 2201/34* (2013.01); *B23K 2203/12* (2013.01); *B23K 2203/18* (2013.01); *B23K 2203/26* (2015.10); *B32B 15/01* (2013.01); *Y10T 428/12493* (2015.01)

(56) References Cited

U.S. PATENT DOCUMENTS

| | | | |
|---|---|---|---|
| 5,343,014 A | | 8/1994 | Ogino et al. |
| 6,221,505 B1 | | 4/2001 | Shirai et al. |
| 6,500,393 B2 | * | 12/2002 | Nakamori ............. B23K 26/20 228/181 |
| 8,415,027 B2 | * | 4/2013 | Hayashi et al. .............. 428/675 |
| 2002/0142184 A1 | * | 10/2002 | Mazumder et al. .......... 428/594 |
| 2007/0138234 A1 | * | 6/2007 | Waskey ................. B23K 9/028 228/101 |
| 2009/0236321 A1 | * | 9/2009 | Hayashi et al. ......... 219/121.64 |

FOREIGN PATENT DOCUMENTS

| | | |
|---|---|---|
| JP | 62-068691 A | 3/1987 |
| JP | 06-155030 A | 3/1994 |
| JP | 3272787 B2 | 1/2002 |
| JP | 3272787 B2 | 4/2002 |
| JP | 2007-165690 A | 6/2007 |
| JP | 2009-226420 A | 8/2009 |
| JP | 2010-069489 A | 4/2010 |
| WO | 92/00828 A1 | 1/1992 |

OTHER PUBLICATIONS

International Search Report for Application No. PCT/JP2012/000962 dated May 15, 2012.

English translation of Chinese Search Report for Application No. 2012800031530 dated May 20, 2014.

* cited by examiner

LASER-BONDED COMPONENT AND PRODUCTION METHOD FOR SAME

TECHNICAL FIELD

The present invention relates to a laser-bonded component, and a production method thereof by superposition-bonding of metal plates with a small irradiation energy of laser light so as to obtain sufficient bonding strength.

BACKGROUND ART

As a laser-bonded component and a production method thereof in the related art, there is a method for superposition-bonding of copper plates (for example, refer to PTL 1). A nickel plated film is formed on a surface of a copper plate, and then the plated film is irradiated with laser light so as to bond the superposed copper plates. FIG. 6 is a diagram illustrating a laser-bonded component and a production method thereof that are disclosed in PTL 1.

As shown in FIG. 6, copper plate 12 is disposed on clad material 11. Clad material 11 is a laminated body of copper and a copper-molybdenum sintered body. Nickel plated film 13 is formed on a surface (top face) of copper plate 12. A YAG laser light absorbing rate of nickel is 2.5 times a YAG laser light absorbing rate of copper and a copper alloy. In a case where nickel plated film 13 is irradiated with laser light to weld copper plate 12 to clad material 11, a desired welding state may be obtained with relatively lower laser power and energy compared to a case in which copper plate 12 is irradiated with laser light to weld copper plate 12 to clad material 11.

In addition, FIG. 7 is a diagram illustrating a laser-bonded component and a production method thereof in the related art disclosed in PTL 2. As shown in FIG. 7, an end face of clad material 22 and an end face of clad material 23 come into contact with each other. Both of clad plates 22 and 23 are laminates of high melting point material 24 and low melting point material 25. High melting point material 24 of clad material 22 and high melting point material 24' of clad material 23 come into contact with each other, and also low melting point material 25 of clad material 22 and low melting point material 25' of clad material 23 come into contact with each other. Contact portion 28 between high melting point materials 24 and 24' is irradiated with laser light to weld high melting point materials 24 and 24', whereby bead portion 26 is formed. Next, contact portion 29 between low melting point materials 25 and 25' is irradiated with laser light to weld low melting point materials 25 and 25', whereby bead portion 27 is formed. In this method, weld penetration of high melting point material 24 with low melting point material 25 substantially does not occur. Accordingly, characteristics of clad materials 22 and 23 are maintained in a laser-bonded component obtained by laser bonding (for example, refer to PTL 2).

In addition, as a method in which a first metallic plate and a second metallic plate are superposed, and laser light is emitted from the first metallic plate side to bond the metallic plates each other, there is a known method in which a first plated film is formed on one surface or both surfaces of the first metallic plate, and then a second plated film is formed on one surface or both surfaces of the second metallic plate. Both of the first plated film and the second plated film have a thickness of several µm. In a case where a laser light absorbing rate of the first plated film is higher than a laser light absorbing rate of the second plated film, laser energy may be set to be relatively small. In addition, in a case where a melting point of the first plated film is higher than a melting point of the second plated film, explosion of the first plated film due to the irradiation of laser light is prevented. In a case where the melting point of the second plated film is higher than the melting point of the first plate film, explosion of the second metallic plate due to the irradiation of laser light is prevented (For example, refer to PTL 3 to 6).

In addition, there is a known method in which a cover plate of copper or a copper alloy including a solder film is superposed on a base plate of a copper alloy including a solder film and then the cover plate is irradiated with laser light to bond the members each other is disclosed (for example, refer to PTL 7 and 8).

CITATION LIST

Patent Literature

PTL 1: Japanese Patent Application Laid-Open No. 2007-165690
PTL 2: Japanese Patent No. 3272787
PTL 3: Japanese Patent Application Laid-Open No. 2009-226420
PTL 4: Specification of US Patent Application Laid-Open 2009/0236321
PTL 5: Pamphlet of WO1992/000828
PTL 6: Specification of U.S. Pat. No. 5,343,014
PTL 7: Japanese Patent Application Laid-Open No. 62-068691
PTL 8: Specification of U.S. Pat. No. 4,697,061

SUMMARY OF INVENTION

Technical Problem

In the related art, in a case where copper is used as a material of the metallic plate and nickel is used as a material of the plated film, the laser light absorbing rate increases due to the nickel plated film on the surface. However, since thermal conductivity of copper is high and the nickel plated film is thin, heat diffuses from a laser light irradiation portion to the periphery, and thus a temperature at the periphery of the laser light irradiation portion increases. Therefore, there is a problem that considerable energy is necessary to sufficiently increase the temperature of the laser light irradiation portion and perform laser bonding.

The invention has been made to solve the above-described problems, and an object thereof is to provide a laser-bonded component and a production method thereof which are capable of securing sufficient bonding strength with small laser energy and in which an increase in temperature of the periphery of the laser light irradiation portion is small.

Solution to Problem

To accomplish the object, the invention provides the following laser-bonded components.

[1] A laser-bonded component, comprising:
a metallic member X that is made of a first metallic material;
a metallic member Y that is made of the first metallic material and is arranged on the metallic member X;
a surface layer that is formed on a top face of the metallic member Y and that is made of a second metallic material, the second metallic material being capable of alloying with the first metallic material, a laser light absorbing rate of the second metallic material being higher than a laser light absorbing rate of the first metallic material, and a fracture strength of the second metallic material being higher than a fracture strength of the first metallic material; and a re-solidification portion that is formed by alloying of the first metallic material with the second metallic material which are melted by irradiation of laser light from an upper side of the surface layer, the re-solidification portion penetrating from a surface of the surface layer to the inside of the metallic member X.

[2] The laser-bonded component according to [1],
wherein a thickness of the metallic member Y is 0.1 mm or more, and
a thickness of the surface layer is 1/10 to 1/2 times the thickness of the metallic member Y.

[3] The laser-bonded component according to [1] or [2], wherein a melting temperature of the second metallic material is higher than a melting temperature of the first metallic material.

[4] The laser-bonded component according to any one of [1] to [3],
wherein a width of the re-solidification portion in a top face of the metallic member X is larger than a width of the re-solidification portion in a top face of the metallic member Y.

[5] The laser-bonded component according to any one of [1] to [4],
wherein corrosion resistance of the second metallic material is higher than corrosion resistance of the first metallic material.

[6] The laser-bonded component according to any one of [1] to [5],
wherein the first metallic material is Cu, and
the second metallic material is Ni.

[7] The laser-bonded component according to any one of [1] to [6], further comprising:
an intermediate layer that is made of the second metallic material and is formed on a top face of the metallic member X or a bottom face of the metallic member Y.

[8] The laser-bonded component according to any one of [1] to [7],
wherein an inclination angle of a central axial line of the re-solidification portion with respect to a normal line to a surface of the surface layer is 5 to 45 degrees.

In addition, to accomplish the object, the invention provides the following method of producing a laser-bonded component.

[9] A method of producing a laser-bonded component, comprising:
a first process of preparing a laminated body in which a metallic member X that is made of a first metallic material, a metallic member Y that is made of the first metallic material, and a surface layer that is made of a second metallic material and that is formed on a top face of the metallic member Y are superposed in this order from a lower side, the second metallic material being capable of alloying with the first metallic material; and
a second process of emitting laser light to the surface layer so as to alloy the second metallic material of the surface layer with the first metallic material of the metallic member X and the metallic member Y and to form a re-solidification portion penetrating from a surface of the surface layer to the inside of the metallic member X
wherein a laser light absorbing rate of the second metallic material is higher than a laser light absorbing rate of the first metallic material, and fracture strength of the second metallic material is higher than fracture strength of the first metallic material.

[10] The method of producing a laser-bonded component according to [9],
wherein the second process is a process of emitting the laser light in an inclination direction with respect to a normal line to the surface of the surface layer, and
the method further comprises a process of scanning a surface of the surface layer with the laser light in a direction not parallel with a plane, the plane including a normal line to the surface of the surface layer and an irradiation axis of the laser light.

[11] The method of producing a laser-bonded component according to [10],
wherein an inclination angle of the irradiation axis with respect to the normal line is 5 to 45 degrees.

[12] The method of producing a laser-bonded component according to any one of [9] to [11],
wherein a wavelength of the laser light is 0.8 to 2.0 µm.

[13] The method of producing a laser-bonded component according any one of [9] to [12],
wherein a laser oscillator that emits the laser light is a fiber laser oscillator.

Furthermore, the invention provides a battery comprising: the laser-bonded component according to any one of [1] to [8].

Advantageous Effects of Invention

According to the invention, since the surface layer is made of the second metallic material having fracture strength higher than that of the first metallic material, and the re-solidification portion is formed from the surface layer side by laser bonding with laser irradiation, sufficient bonding strength via a relatively small bonding area between the metallic member X and the metallic member Y may be obtained. In addition, commonly, the thickness of the surface layer becomes larger than the thickness of a plated film. Therefore, according to the laser-bonded component and the method of producing the same of the invention, sufficient bonding strength may be secured with small laser energy. As a result, an increase in temperature of the periphery of the laser irradiation portion may be prevented.

DESCRIPTION OF EMBODIMENTS

Figure 1A:
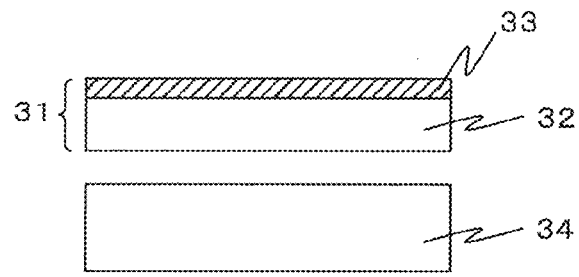
FIGS. 1A to 1D are cross-sectional diagrams illustrating a laser-bonded component and processes of a production method thereof that are related to Embodiment 1.

A laser-bonded component of the invention includes a metallic member X, a metallic member Y that is disposed on the metallic member X, a surface layer that is formed on a top face of the metallic member Y, and a re-solidification portion that penetrates from the surface of the surface layer to the inside of the metallic member X.

Both the metallic member X and the metallic member Y are made of a first metallic material. The first metallic material may be selected among metals or alloys in accordance with use of the laser-bonded member. A shape of the metallic member X is not particularly limited to the extent that the metallic member Y can be superposed thereon.

The thickness of the metallic member Y is not particularly limited, and a thickness of a position at which a re-solidification portion is formed is enough to form the re-solidification portion by laser bonding. It is preferable that the thickness of the metallic member Y be 0.1 mm or more, from the viewpoint of securing strength as a structure material. In addition, from the viewpoint of forming the re-solidification portion by laser bonding, it is preferable that the thickness of the metallic member Y at the portion at which the re-solidification portion of the metallic member Y is formed be 2.0 mm or less.

The surface layer is made of a second metallic material. As the second metallic material, a metal or an alloy, which satisfies conditions to be described later, may be selected from metals and alloys. First, the second metallic material is possible to be alloyed with the first metallic material at the time of being melted. It is preferable that the second metallic material be a material making up an all-proportional solid solution with the first metallic material. The second metallic material is a metallic material capable of forming an alloy.

A laser light absorbing rate of the second metallic material is higher than a laser light absorbing rate of the first metallic material. Alternatively, a reflectance of the second metallic material is smaller than a reflectance of the first metallic material. It is preferable that a difference between the reflectance of the first metallic material and the reflectance of the second metallic material be 1% or more from the viewpoints of laser energy reduction. The reflectance of the first metallic material and the reflectance of the second metallic material may be measured, for example, using a spectrophotometer.

Furthermore, fracture strength of the second metallic material is larger than fracture strength of the first metallic material. The fracture strength may be measured by measurement of tensile strength. It is preferable that the fracture strength of the second metallic material be larger than the fracture strength of the first metallic material by 0.2 kg/mm$^2$ or more from the viewpoint of obtaining sufficient bonding strength by the laser bonding.

In addition, it is preferable that a melting temperature of the second metallic material be higher than a melting temperature of the first metallic material from the viewpoint of forming the re-solidification portion to a relatively deeper position from a surface of the surface layer. It is preferable that the melting temperature of the second metallic material be higher than the melting temperature of the first metallic material by 80° C. or more.

It is preferable that a thermal conductivity of the second metallic material be lower than a thermal conductivity of the first metallic material from the viewpoint of making an area of the re-solidification portion smaller than a laser irradiation area. It is preferable that the thermal conductivity of the second metallic material be lower than the thermal conductivity of the first metallic material by 10 W/(m·K) or more.

In addition, it is preferable that corrosion resistance of the second metallic material be higher than corrosion resistance of the first metallic material from the viewpoint of obtaining an antirust effect. The smaller difference in a galvanic potential between the first metallic material and the second metallic material is, the higher the corrosion resistance is. It is preferable that the difference in the galvanic potential between the first metallic material and the second metallic material be 0.2 V or less.

The surface layer is formed on a top face of the metallic member Y. The surface layer may be formed on the entirety of the top face of the metallic member Y, or may be formed only on a laser light irradiation portion and the periphery of this portion. For example, it is preferable that the surface layer be formed on the top face of the metallic member Y in such a manner that the surface layer becomes larger than a region irradiated with condensed laser light. In addition, it is preferable that the surface layer be formed on the top face of the metallic member Y in such a manner that the surface layer covers the area including the irradiation part with laser light and a peripheral part of the irradiation part, a width of the peripheral part being 0.1 to 1.0 mm and more.

It is preferable that the thickness of the surface layer at the laser light irradiation portion be 1/10 to 1/2 times the thickness of the metallic member Y. When the thickness of the surface layer is within the range, physical properties of the second metallic material such as fracture strength can be sufficiently provided to the re-solidification portion due to "alloying" at the re-solidification portion to be described later. In addition, it is preferable that the thickness of the surface layer be 1.0 mm or less from the viewpoint of forming the re-solidification portion in the inside of the metallic member X.

For example, the surface layer may be formed on the top face of the metallic member Y in accordance with a thick film-forming method using powders. Alternatively, a commercially available clad material may be used as the metallic member Y having the surface layer.

The re-solidification portion is an alloy of the first metallic material with the second metallic material. The re-solidification portion is integrally bonded to the second metallic material and the first metallic material that are adjacent to the re-solidification portion.

The re-solidification portion is formed from the surface of the surface layer to the inside of the metallic member X by alloying of the first metallic material with the second metallic material that are melted by emitting laser light to the surface layer. Here, the term of "alloying" represents that the first metallic material and the second metallic material are alloyed in order for physical properties of the second metallic material to be notably and significantly exhibited. The physical properties of the second metallic material include fracture strength.

The "alloying" in the invention is different from laser bonding using a plated film in the related art from the viewpoint of allowing desired physical properties of the second metallic material to be notably and significantly exhibited at the re-solidification portion. As described above, for laser-bonding between copper plates, it is known that a nickel plated film is formed on a surface of the plate to be irradiated with a laser light before performing the laser bonding. Commonly, the thickness of the plated film is approximately several µm. Therefore, a content ratio of the second metallic material (nickel) with respect to the first metallic material (copper) decreases in an alloy composition of the re-solidification portion which is formed through the laser bonding that is performed by the emitting laser light to the plated film. Therefore, physical properties (for example, fracture strength) of nickel are commonly not sufficiently exhibited in the re-solidification portion. In the laser bonding between the metallic member X on which the plated film of the second metallic material is formed and the metallic member Y in the related art, the content of the second metallic material at the re-solidification portion is lower than a content enough to allow the desired physical properties of the second metallic material to be notably and significantly exhibited.

The re-solidification portion may be confirmed by observing a cross-section of the laser-bonded component, which includes a cross-section of the re-solidification portion, by an optical microscope. In a case where it is difficult to discriminate a difference between the re-solidification portion and the first metallic material, it is possible for the re-solidification portion to be discriminable with the microscope by etching the cross-section with an acid or an alkali according to necessity. Alternatively, a composition of the metallic material of the re-solidification portion may be confirmed by a common method of detecting a composition of a metallic material such as auger electron spectroscopy and X-ray photoelectron spectroscopy.

Figure 5A:
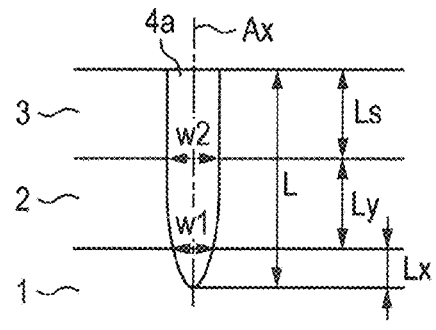
FIGS. 5A to 5D are cross-sectional diagrams illustrating a shape of re-solidification portion.
Figure 5B:
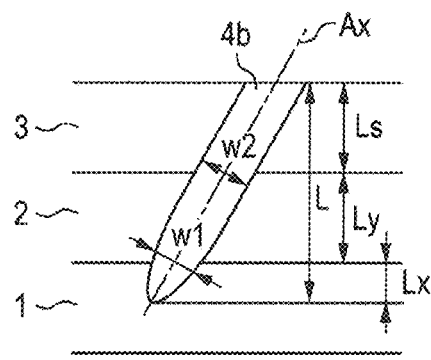

FIG. 5A shows the re-solidification portion (reference numeral: $4a$) that is formed along a normal line to a surface of the surface layer in a laminated body including the metallic member X (reference numeral: 1), the metallic member Y (reference numeral: 2), and the surface layer (reference numeral: 3). FIG. 5B shows the re-solidification portion (reference number: $4b$) that is formed in the laminated body in an inclination direction with respect to the normal line to the surface of the surface layer. An inclination angle of a central axial line of re-solidification portion $4b$ with respect to a normal line to a surface of the surface layer is 5 to 45 degrees. A length of the re-solidification portion along the normal line to a surface of the surface layer is set to L. A length of a portion of the metallic member X in the re-solidification portion along the normal line is defined as Lx, a length of a portion of the metallic member Y in the re-solidification portion along the normal line is defined as Ly, and a length of a portion of the surface layer in the re-solidification portion along the normal line is defined as Ls.

In FIGS. 5A and 5B, a content ratio of the second metallic material with respect the first metallic material (the content of the second metallic material/the content of the first metallic material) in an alloy composition of the re-solidification portion is depending on the size of the Ls. For example, when the ratio of Ls with respect to Ly (thickness ratio) is made to be larger, a ratio of the second metallic material in the alloy composition may be made to be larger. According to this, it is possible to allow the physical properties of the second metallic material in the re-solidification portion to be exhibited in a relatively notable manner.

The laser-bonded component of the invention may further include other configurations within a range capable of obtaining the effects of the invention. For example, the laser-bonded component may further include a metallic member Z that is made of the first metallic material between the metallic member X and the metallic member Y. There may be a single or a plurality of metallic members Z.

Figure 5C:
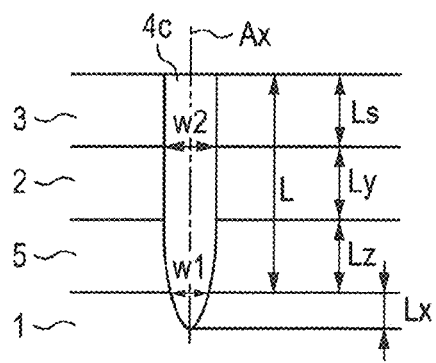

FIG. 5C shows a re-solidification portion (reference numeral $4c$) that is formed along the normal line to the surface of the surface layer in a laminated body including the metallic member X (reference numeral: 1), the metallic member Z (reference numeral: 5), the metallic member Y (reference numeral: 2), and the surface layer (reference numeral: 3). A length of a portion of the metallic member Z in the re-solidification portion along the normal line is defined as Lz. Lz is also the thickness of the metallic member Z. The thickness of the metallic member Z may be appropriately set such that the re-solidification portion can penetrate the inside of the metallic member X from the surface layer through the metallic member Y and the metallic member Z.

In addition, the laser-bonded component of the invention may further include an intermediate layer that is formed on a top face of the metallic member X or a bottom face of the metallic member Y. The intermediate layer is made of the second metallic material. Similarly to the surface layer, the intermediate layer may be formed on the entirety of the top face of the metallic member X, on the entirety of the bottom face of the metallic member Y, or only in a position corresponding to a laser irradiation portion.

Figure 5D:
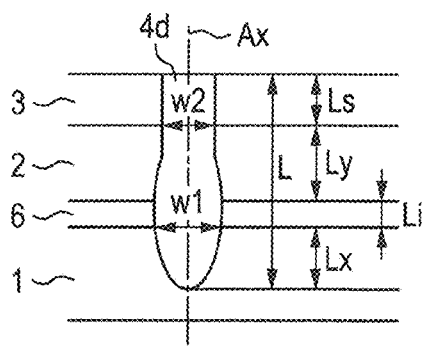
Figure 6:
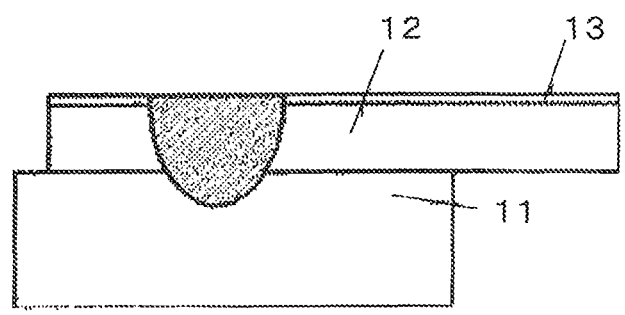
FIG. 6 is a cross-sectional diagram illustrating a welded state of a laser-bonded component and a production method thereof in the related art described in PTL 1.
Figure 7:
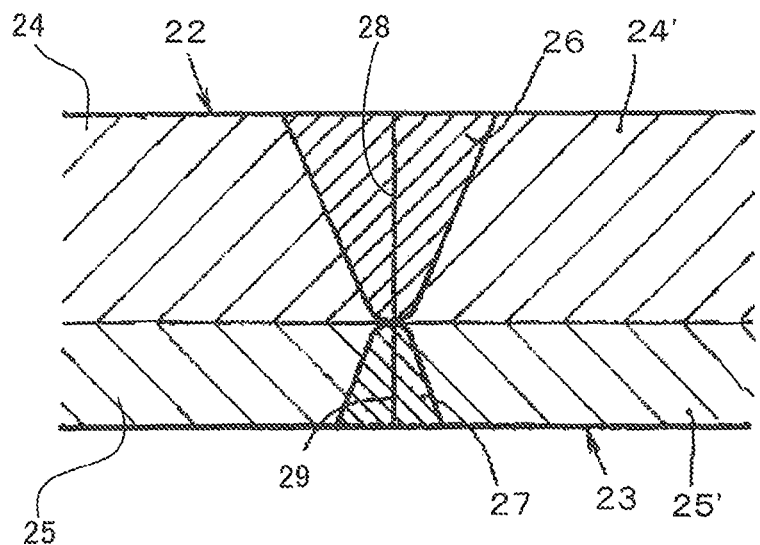
FIG. 7 is a cross-sectional diagram illustrating a welded state of a laser-bonded component and a production method thereof in the related art described in PTL 2.

FIG. 5D shows a re-solidification portion (reference numeral $4d$) that is formed along the normal line to the surface of the surface layer in a laminated body including the metallic member X (reference numeral: 1), the intermediate layer (reference numeral: 6), the metallic member Y (reference numeral: 2), and the surface layer (reference numeral: 3). A length of a portion of the intermediate layer in the re-solidification portion along the normal line is defined as Li. Li is also the thickness of the intermediate layer.

Here, as shown in FIGS. 5A to 5D, a width in the top face of the metallic member X is defined as W1, and a width in the top face of the metallic member Y is defined as W2. W1 is also a width of the re-solidification portion at an intersection point between an interface of the metallic member X and the metallic member Y (the metallic member Z in FIG. 5C) and a central axial line Ax of the re-solidification portion. W2 is also a width of the re-solidification portion at an intersection point between an interface of the metallic member Y and the surface layer and a central axial line Ax of the re-solidification portion. In the re-solidification portion, a surface layer side is defined as a base end side, and the metallic member X side is defined as a front end side. In general, the re-solidification portion has a shape in which a width at the base end portion is constant and a width at the front end portion gradually decreases. Therefore, commonly, W1 is smaller than W2.

The laser-bonded component of the invention may be produced by the following method.

The method of producing the laser-bonded component includes a first process of preparing a laminated body in which the metallic member X, the metallic member Y, and the surface layer are superposed in this order from a lower side, and a second process of emitting laser light to the laminated body to form the re-solidification portion penetrating from the surface of the surface layer to the inside of the metallic member X. In the second process, the second metallic material constituting the surface layer and the first metallic material constituting the metallic member X and the metallic member Y are alloyed while being melted by the laser light irradiation.

The first process may be carried out by forming the surface layer on the top face of the metallic member Y and placing the metallic member Y on the metallic member X. Alternatively, the first process may be carried out by placing a clad material on the metallic member X. The "clad material" includes a member made of the first metallic material and a surface layer made of the second metallic material and formed on the top face of the member. And also the clad material is formed by pressure-welding the second metallic material and the first metallic material. The metallic member Y or the clad material may be temporarily fixed to the metallic member X for positioning.

The laser light that is emitted in the second process may be selected in accordance with kinds of the first metallic material and the second metallic material. The laser light may be suitably selected, the laser having a wavelength with which a difference in reflectance of light on a mirror face between the first metallic material and the second metallic material is 1% or more. For example, in a case where a metallic member that is commonly used for an electrode member or a structure material in an electronic device is laser-bonded by the method of the invention, it is preferable that the wavelength of the laser light be 0.8 to 2.0 μm.

It is preferable that the laser light is absorbed by the metallic member to a deeper position thereof with a small irradiation area in the viewpoint that a cross-sectional area of the re-solidification portion in an axial direction is made small and a relatively long re-solidification portion is formed along the axial direction. The laser light source may be fiber laser.

Figure 4A:
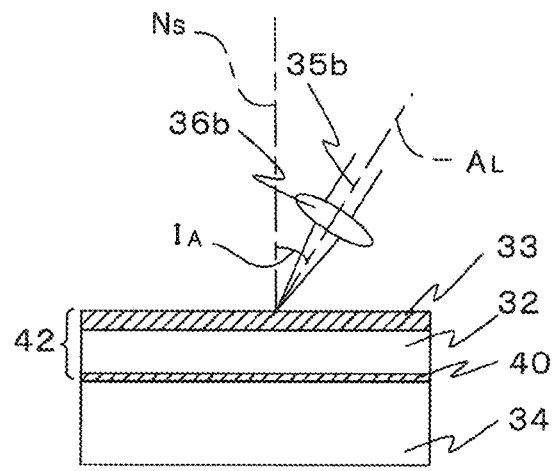
FIGS. 4A to 4C are cross-sectional diagrams illustrating a laser-bonded component and processes of a production method thereof that are related to Embodiment 3.
Figure 4B:
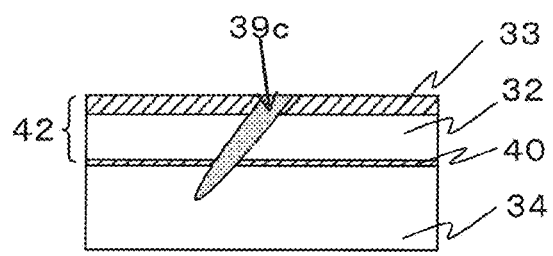
Figure 4C:
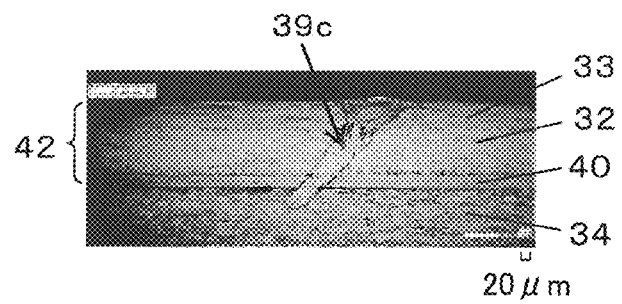

When the second process is a process of emitting the laser light in a direction inclined with respect to the normal line to the surface of the surface layer, the re-solidification portion inclined with respect to the normal line may be formed. The inclined re-solidification portion is preferable from the viewpoint of relatively increasing the bonding strength along the normal line direction. It is preferable that an inclination angle of an irradiation axis of laser light with respect to the normal line be 5 to 45 degrees from the viewpoint of stabilization of the laser irradiation and the viewpoint of obtaining the re-solidification portion having a sufficient depth (FIG. 4A to 4C).

The method of producing the laser-bonded component may further include other processes as long as the effects of the invention can be obtained. Examples of other processes include a process of scanning the surface of the surface layer with the laser light. It is preferable that a laser light scanning direction can be a direction not parallel with a plane including the normal line and the irradiation axis, from the viewpoint of obtaining the bonding strength higher than the strength obtained by irradiation of laser light in a direction inclined with respect to the normal line. It is also preferable that the laser light scanning direction be orthogonal to the plane including the normal line and the irradiation axis, from the above-described viewpoint (Embodiment 3).

A battery of the invention includes the above-described laser-bonded component. In the battery, the above-described laser-bonded component is suitable for an electrode member in a unit cell or a battery pack. Further, the laser-bonded component may be used for a structure material of the battery pack.

Hereinafter, embodiments of the invention will be described with reference to the attached drawings.

Embodiment 1

FIGS. 1A to 1D show cross-sectional diagrams illustrating a laser-bonded component and processes a production method thereof in Embodiment 1.

As shown in FIG. 1A, clad material 31 is superposed on copper plate 34 having a thickness of 0.4 mm. Clad material 31 is obtained by forming nickel layer 33 having a thickness of 0.1 mm on copper plate 32 having a thickness of 0.2 mm. Clad material 31 may be superposed on copper plate 34 at a desired position with nickel layer 33 set as an upper side. Copper plate 34 corresponds to the metallic member X. Copper plate 32 corresponds to the metallic member Y. Nickel layer 33 corresponds to the surface layer. Copper corresponds to the first metallic material. Nickel corresponds to the second metallic material. An assembly in which clad material 31 is superposed on copper plate 32 corresponds to the laminated body.

Figure 1B:
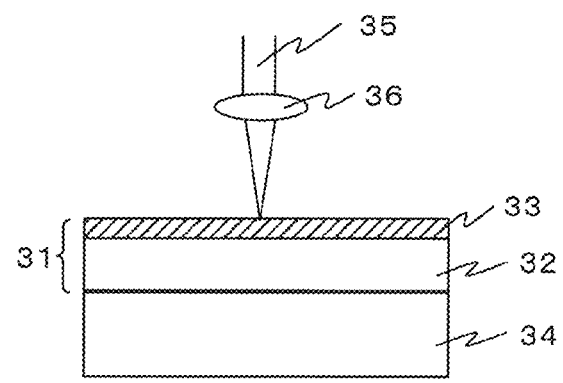

As shown in FIG. 1B, laser light 35 emitted from an upper side of nickel layer 33 is condensed by condensing lens 36 and is emitted to nickel layer 33. Laser light 35 is fiber laser that is emitted by an output of 260 W and has a wavelength of 1.08 μm. In addition, the top face of nickel layer 33 is scanned with laser light 35 in a direction orthogonal to a paper plane in FIG. 1B at a speed of 70 mm/second.

A reflectance on a mirror face of copper and a reflectance on a mirror face of nickel of light (such as second harmonic YAG laser) having a wavelength of 0.5 μm are 62%. A reflectance on the mirror face of copper and a reflectance on the mirror face of nickel of light (such as carbon dioxide laser) having a wavelength of 10.6 μm are 97%. Light (such as YAG laser, the fiber laser and semiconductor laser) having a wavelength of 1.06 μm has a reflectance of 98% on the mirror face of copper, and has a reflectance of 67% on the mirror face of nickel. Accordingly, an absorption rate of the YAG laser, the fiber laser, or the semiconductor laser into nickel is significantly higher than an absorption rate into copper. Therefore, it is preferable to allow laser to be effectively absorbed into the nickel layer by using laser having a wavelength of 0.8 to 2.0 μm such as the YAG laser, the fiber laser, and the semiconductor laser.

A melting temperature of copper is 1,083° C. and a melting temperature of nickel is 1,453° C. Densities of copper and nickel are 8.93 g/cm$^2$, respectively. Therefore, when being irradiated with laser light 35, a melted nickel having a temperature exceeding the melting temperature of copper heats copper plate 32 contacting with nickel layer 33. Accordingly, in addition to heating of copper plate 32 by laser light, the melted nickel also heats copper plate 32, and thus it becomes further easier to melt copper plate 32. In addition, thermal conductivities of copper and nickel are 398 W/(m·K) and 90.5 W/(m·K), respectively. Accordingly, thermal diffusion in a plane direction may be suppressed at the periphery of the portion irradiated with laser light 35. Accordingly, the bonding between clad material 31 and copper plate 34 may be effectively carried out, as well as the thermal diffusion to the periphery may be reduced. Accordingly, the laser-bonding of this embodiment is suitable for laser-bonding that is carried out in the vicinity of an electronic component or the like that may be exposed to a high temperature and may be damaged.

Figure 1C:
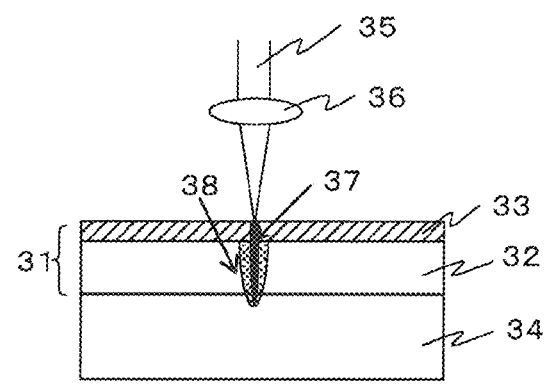

The fiber laser has particularly superior light condensing properties and a condensed spot diameter may be reduced to 10 μm. Therefore, as shown in FIG. 1C, a melted portion having a small area is formed in the surface of nickel layer 33, and laser energy penetrates into a deep position inside the laminated body. Accordingly, a narrow and deep melted portion may be formed by a keyhole processing. The melted portion spreads into a portion irradiated with laser, and thus a deep and narrow nickel melted region 37 is formed, and copper melted region 38 is formed at the periphery thereof due to propagation of heat. In addition, nickel melted region 37 and copper melted region 38 are miscible with each other by convection in the melted region or the like.

Figure 1D:
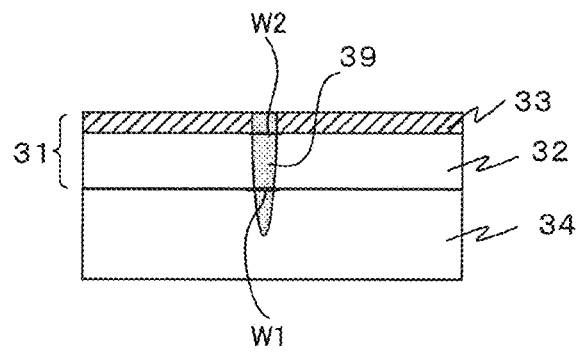

An alloy of both metals is all-proportional solid solution. Therefore, as shown in FIG. 1D, both the metals are easily alloyed in an arbitrarily composition ratio while being melted, and the alloying proceeds to a depth direction. As a result, re-solidification portion 39 due to the alloying is formed from the surface of nickel layer 33 to the inside of copper plate 34, and thus connects clad material 31 with copper plate 34. Re-solidification portion 39 is alloyed at an interface between clad material 31 and copper plate 34.

Since re-solidification portion 39 solidifies while being miscible as described above, a structure (such as a columnar structure) that is specific to static solidification is little, and a composition thereof also varies depending on a position and is not constant. Tensile strength of copper is 21.7 kgf/mm$^2$ (212.8 N/mm$^2$) and tensile strength of nickel is 32.2 kgf/mm$^2$ (315.8 N/mm$^2$), which are one index of the fracture strength. Due to the alloying of copper with nickel having strength higher than that of copper, hardness of re-solidification portion 39 becomes relatively higher than hardness of a re-solidification portion made of an unalloyed copper. Accordingly, the strength of re-solidification portion 39 becomes higher due to the content of nickel than strength of a re-solidification portion made of an unalloyed copper. As a result, a welded area in this embodiment, which is necessary for obtaining the same fracture strength, becomes smaller than a welded area in a welded portion of laser bonding of copper members.

For example, in a case of bonding copper members by emitting fiber laser at 250 W and at a scanning speed of 20 mm/second, fracture strength of a welded portion to be obtained is 2 N/mm. On the other hand, in a case where the fiber laser according to this embodiment is emitted at 250 W and at a scanning speed of 120 mm/second to form re-solidification portion 39, the fracture strength of re-solidification portion 39 is 12 N/mm. In this manner, according to the laser bonding of this embodiment, productivity and strength are improved significantly compared to the laser bonding of copper members. Accordingly, when nickel layer 33 is provided, smaller laser energy is necessary to obtain the same bonding strength. In addition, since corrosion resistance of nickel is higher than that of copper, a corrosion-resistant effect may also be obtained. When dissimilar metals come into contact with each other, electrolytic corrosion can occur. In 3% sodium chloride solution, a galvanic potential of copper is +0.04 V and a galvanic potential of nickel is −0.03 V. A potential difference between the metals is very small. Accordingly, it is difficult for the electrolytic corrosion to occur in re-solidification portion 39 made of these metals.

In addition, this embodiment has a configuration in which nickel layer 33 is provided on copper plate 32. However, a combination of the first metallic material and the second metallic material is not limited to the combination of copper and nickel. The same effect may be obtained as long as the second metallic material that constitutes the surface layer has a lower reflectance of laser light and higher fracture strength compared to the first metallic material, and the first metallic material and the second metallic material are easy to be alloyed. For example, when a copper alloy such as brass and bronze is used as main component of the first metallic material instead of copper, the same effect can be obtained.

Alternatively a binary alloy of iron and copper is also an all-proportional solid solution. When an iron layer having a low reflectance is formed as the surface layer on a surface of the copper plate, the same effect may be obtained. A binary alloy of iron and chrome is also an all-proportional solid solution. When an iron layer having a low reflectance is formed as the surface layer on a surface of the chrome plate, the same effect may be obtained.

Further, a re-solidification portion can be made of alloy which is not the all-proportional solid solution. For example, a chrome layer as the surface layer is formed on a surface of an aluminum plate, an aluminum layer as the surface layer is formed on a surface of a copper plate, or an iron layer as the surface layer is formed on a surface of an aluminum plate. By these configurations, the same effect may be obtained.

Further, in a case where steel containing iron as a main component or steel such as stainless steel containing nickel or chrome is used instead of iron, the same effect may be obtained.

In this embodiment, it is preferable that the thickness of copper plate 32 be, for example, 0.1 mm or more from the viewpoint of securing strength as a structure material. Into a metallic material, an absorption depth of light having a wavelength of 0.5 to 10.6 μm, which is a wavelength of lots of processing laser, is 0.007 to 0.037 μm. Therefore, for only an improvement in an absorption rate of laser light, the thickness of nickel layer 33 may be 0.04% of 0.1 mm that is the thickness of copper plate 32. The thickness of nickel plated layer of several μm corresponds to several % of 0.1 mm that is the plate thickness of copper plate 32. However, it has to be considered that, in an alloy of a metal (nickel in this embodiment) of a surface layer with a metal of a metallic material, physical properties of the metal of the surface layer can notably and significantly exhibit, although the content of the metal component of the surface layer is smaller than that of a metal component of the metallic material. Therefore, it is necessary for the metal component of the surface layer to be contained in the alloy at least in an amount of 10 to 50%. From this viewpoint, it is preferable that the thickness of nickel layer 33 be $\frac{1}{10}$ to $\frac{1}{2}$ times the thickness of copper plate 32.

Embodiment 2

Figure 2A:
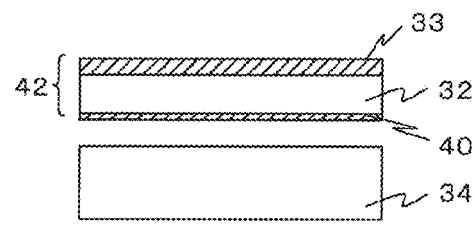
FIGS. 2A to 2E are cross-sectional diagrams illustrating a laser-bonded component and processes of a production method thereof that are related to Embodiment 2.
Figure 2B:
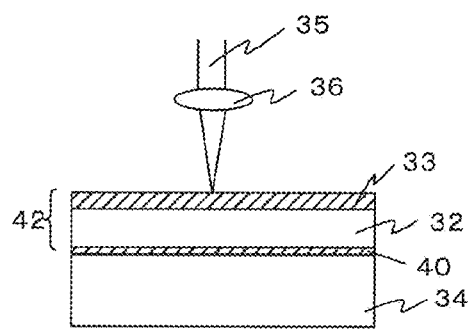
Figure 2C:
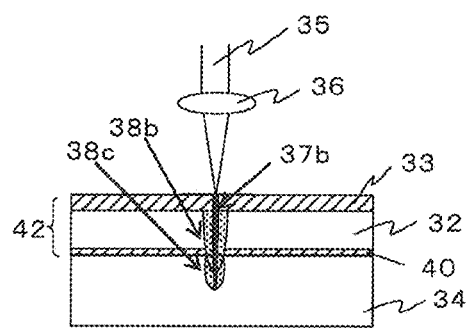
Figure 2D:
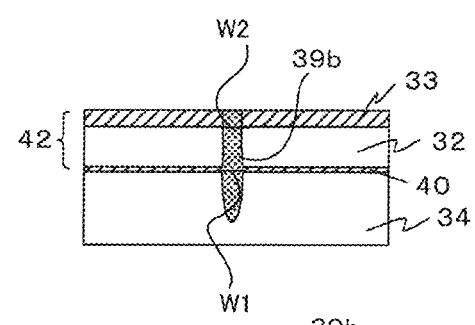
Figure 2E:
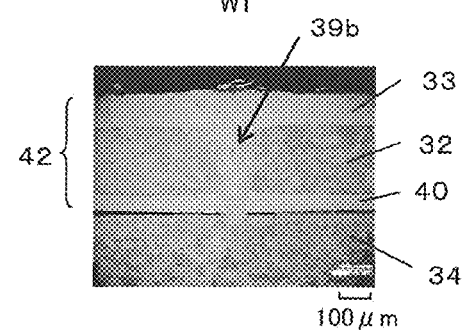

FIGS. 2A to 2E show cross-sectional diagrams illustrating a laser-bonded component and processes of a production method thereof related to Embodiment 2. FIG. 2E shows an optical photomicrograph (a halftone image displayed on a display) of a cross-section including a re-solidification portion of a laser-bonded component in Embodiment 2. In FIGS. 2A to 2E, the same reference numerals are given to the same constituent elements as those in FIG. 1, and description thereof will be omitted.

FIGS. 2A to 2E are different from FIGS. 1A to 2D in that clad material 31 is changed to clad material 42 further including nickel layer 40 having a thickness of 0.05 mm under copper plate 32 (on a bottom surface thereof) in addition to copper plate 32 and nickel layer 33. Nickel layer 40 corresponds to the intermediate layer.

An irradiation sequence of laser light 35 in FIG. 2B is the same as that in FIGS. 1A to 1D. In FIG. 2C, similarly to FIGS. 1A to 1D, deep and narrow nickel melted region 37b is formed by a keyhole processing. Copper melted region 38b is formed at the periphery of nickel melted region 37b due to diffusion of heat. When nickel melted region 37b reaches nickel layer 40, nickel layer 40 is melted. Nickel melted region 37b grows in a depth direction, while wide copper melted region 38c is formed inside copper plate 34.

As a result thereof, as shown in a schematic diagram of FIG. 2D and a cross-section photograph of FIG. 2E, re-solidification portion 39b has a shape in which a diameter slightly increases at an interface between nickel layer 40 and copper plate 34 (W1>W2). Furthermore, a nickel concentration of re-solidification portion 39b increases at a portion at which the diameter increases. Since a bonding area increases, as well as a nickel content increases, the bonding strength is further improved.

Figure 3:
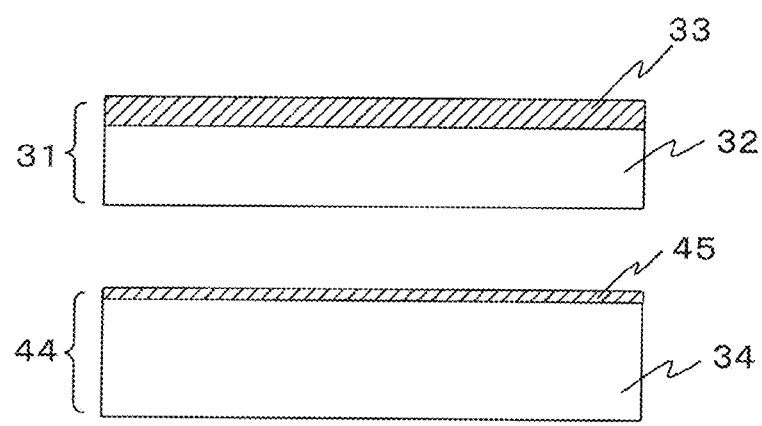
FIG. 3 is a cross-sectional diagram illustrating materials to be bonded of the laser-bonded component and the production method thereof that are related to Embodiment 2.

In addition, as shown in FIG. 3, even when clad material 44 including copper plate 34 and nickel layer 45 formed on copper plate 34 is used instead of copper plate 34, the same result may be obtained.

Embodiment 3

FIG. 4A to 4C show cross-sectional diagrams illustrating a laser-bonded component and processes of a production method thereof related to Embodiment 3. FIG. 4C shows an optical photomicrograph (a halftone image displayed on a display) of a cross-section including a re-solidification portion of a laser-bonded component in Embodiment 3.

FIG. 4A to 4C are different from FIGS. 2A to 2E in that condensing lens 36b is provided such that emitted laser light 35b is inclined and in that a surface of nickel layer 33 is scanned with laser light in a direction orthogonal to a paper plane of FIG. 4A. As shown in FIG. 4A, a scanning direction is a direction orthogonal to a plane including a normal line Ns of a surface of nickel layer 33 and an irradiation axis $A_L$ of laser light, which intersects the normal line Ns. An angle is defined as an inclination angle $I_A$, the angle being formed on the surface of nickel layer 33 by the normal line Ns and the irradiation axis $A_L$ intersecting the normal line Ns.

It is not necessary for the scanning direction to be orthogonal to the paper plane of FIG. 4A. When emitted laser light 35b is inclined, it is possible to prevent a part of laser light 35b from being reflected on the surface of nickel layer 33 and returning to a laser oscillator. Thus, it is possible to prevent an oscillation of the laser oscillator from being unstable. As shown in a schematic diagram of FIG. 4B and a cross-section photograph of FIG. 4C, alloyed re-solidification portion 39c inclined to the normal line Ns is formed at the inside of clad material 42 and copper plate 34.

When peeling stress occurs in a plate thickness direction (a direction along the normal line Ns) of the laser-bonded member, a breakage at an interface between a re-solidification portion and the first metallic material can be occur. However, since re-solidification portion 39c inclined to each of the copper plates is formed, it is difficult for breakage due to peeling stress to occur in the plate thickness direction. Accordingly, a resistance force against the peeling stress may be further increased compared to a case in which a re-solidification portion is formed in a direction orthogonal to the surface of each of the copper plates. When the inclination angle of laser light 35b is 5 degrees or more to the normal line to the surface of nickel layer 33, returning of the emitted laser light to the laser oscillator may be avoided. When the inclination angel is large, a reflectance at the surface layer of laser light 35b increases, and thus it may be difficult for irradiation energy to be effectively absorbed to clad material 42. And also, the depth of re-solidification portion 39c may be shallow. Form this viewpoint, it is preferable that the inclination angle be 45 degrees or less.

The disclosure of Japanese Patent Application No. 2011-055113, filed on Mar. 14, 2011, including the specification, drawings and abstract, is incorporated herein by reference in its entirety.

INDUSTRIAL APPLICABILITY

According to the laser-bonded component and the production method thereof of the invention, sufficient bonding strength with little laser energy may be secured. And thus an increase in temperature of the periphery of the irradiated part may be made small. Accordingly, the invention is suitable for use in securement of strength of a mechanism element, an electrode material of a battery, and the like, and for use in securement of conductivity of electricity, heat, and the like.

REFERENCE SIGNS LIST

1 Metallic member X
2 Metallic member Y
3 Surface layer
4a to 4d, 39, 39b, 39c Re-solidification portion
5 Metallic member Z
6 Intermediate layer
11, 31, 42, 44 Clad material
12, 32, 34 Copper plate
13 Nickel plated film
22, 23 Clad plate
24, 24' High melting point material
25, 25' Low melting point material
26, 27 Bead portion
28, 29 Contact portion
33, 40, 45 Nickel layer
35, 35b Laser light
36, 36b Condensing lens
37, 37b Nickel-melted region
38, 38c Copper-melted region
$A_L$ Irradiation axis of laser light 35b
Ax Central axial line of re-solidification portions 4a to 4d
$I_A$ Inclination angle
L Length of re-solidification portions 4a to 4d
Li Length of intermediate layer 6 in re-solidification portions 4a to 4d
Ls Length of surface layer 3 in re-solidification portions 4a to 4d
Lx Length of metallic member X in re-solidification portions 4a to 4d
Ly Length of metallic member Y in re-solidification portions 4a to 4d
Lz Length of metallic member Z in re-solidification portions 4a to 4d
Ns Normal line to top face of nickel layer 33
W1 Width of re-solidification portions 4a to 4d in top face of metallic member X
W2 Width of re-solidification portions 4a to 4d in top face of metallic member Y

The invention claimed is:

1. A laser-bonded component, comprising:
a metallic member X that is made of a first metallic material;
a metallic member Y that is made of the first metallic material and is arranged on the metallic member X;
a surface layer that is formed on a top face of the metallic member Y and that is made of a second metallic material, the second metallic material being capable of alloying with the first metallic material, a laser light absorbing rate of the second metallic material being higher than a laser light absorbing rate of the first metallic material, and a fracture strength of the second metallic material being higher than a fracture strength of the first metallic material;
an intermediate layer that made of the second metallic material and is formed on a top face of the metallic member X or a bottom face of the metallic member Y; and
a re-solidification portion that is formed by a keyhole processing by alloying of the first metallic material of the metallic member X and the metallic member Y with the second metallic material of the surface layer, the alloying being effected by melting the first metallic material and the second metallic material by irradiation of laser light from an upper side of the surface layer, the re-solidification portion penetrating from a surface of the surface layer to the inside of the metallic member X, wherein a width of the re-solidification portion at an interface of the metallic member X and the intermediate layer is larger than a width of the re-solidification portion in a top face of the metallic member Y, and the metallic member Y is arranged closer to the laser light than the metallic member X during the irradiation of the laser light, and a thickness of the surface layer is $\frac{1}{10}$ to $\frac{1}{2}$ times the thickness of the metallic member Y, and wherein the surface layer, the metallic member Y, and the intermediate layer are laminated to form a clad material having a metallurgical bond on an atomic level between adjacent layers, or both the surface layer and the metallic member Y are laminated together and the intermediate layer and the metallic member X are laminated together to form clad materials having a metallurgical bond on an atomic level between adjacent layers of the laminated body.

2. The laser-bonded component according to claim 1, wherein a thickness of the metallic member Y is 0.1 mm or more.

3. The laser-bonded component according to claim 1, wherein the re-solidification portion is formed in an inclination direction with respect to a normal line to the surface layer.

4. The laser-bonded component according to claim 3, wherein the re-solidification portion is disposed at an angle between 5 and 45 degrees to the normal line to the surface layer.

5. The laser-bonded component according to claim 1, wherein the metallurgical bond is formed along an entire surface between adjacent layers of the laminated body.

\* \* \* \* \*